US012183065B2

(12) United States Patent
Blau

(10) Patent No.: US 12,183,065 B2
(45) Date of Patent: *Dec. 31, 2024

(54) BONE FRACTURE DETECTION AND CLASSIFICATION

(71) Applicant: metamorphosis GmbH, Altenbeken (DE)

(72) Inventor: Arno Blau, Staufen (DE)

(73) Assignee: metamorphosis GmbH, Altenbaken (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,040

(22) Filed: Feb. 1, 2024

(65) Prior Publication Data
US 2024/0177477 A1 May 30, 2024

Related U.S. Application Data

(63) Continuation of application No. 17/309,395, filed as application No. PCT/EP2019/082222 on Nov. 22, 2019, now Pat. No. 11,922,684.

(30) Foreign Application Priority Data

Nov. 26, 2018 (LU) ........................................ 101008

(51) Int. Cl.
*G06K 9/00* (2022.01)
*A61K 35/12* (2015.01)
(Continued)

(52) U.S. Cl.
CPC ................ *G06V 10/95* (2022.01); *G06T 7/13* (2017.01); *G06T 7/75* (2017.01); *G06V 10/44* (2022.01);
(Continued)

(58) Field of Classification Search
CPC ........ A61B 35/12; A61B 5/4509; G06K 9/00; G06N 3/08
(Continued)

(56) References Cited

U.S. PATENT DOCUMENTS 11,935,654 B2 * 3/2024 Li ........................ G06T 7/0014
2011/0019884 A1 * 1/2011 Blau ..................... A61B 90/37
382/128

(Continued)

OTHER PUBLICATIONS

EPO, International Search Report issued in IA PCT/EP2019/082222 mailed Jan. 21, 2020.
(Continued)

*Primary Examiner* — Seyed H Azarian
(74) *Attorney, Agent, or Firm* — Lorenz & Kopf LLP

(57) ABSTRACT

Method and apparatus are provided for assisting with bone fracture detection. In particular, image data of a medical image is received in a processing unit from a device, which may be an imaging device, a data detection device or an image storage device. A bone structure is identified in the medical image. A fracture line in the identified bone structure is determined. A bone feature, which may include a portion of an outline of the identified bone structure, a point of the fracture line on an outline of the identified bone structure, a relative displacement of bone parts of the identified bone structure, or a combination thereof is detected. The bone feature may be classified and a corresponding output generated.

13 Claims, 6 Drawing Sheets

(51) Int. Cl.
*G06T 7/13* (2017.01)
*G06T 7/73* (2017.01)
*G06V 10/44* (2022.01)
*G06V 10/94* (2022.01)

(52) U.S. Cl.
CPC ............... *G06T 2207/10116* (2013.01); *G06V 2201/033* (2022.01)

(58) Field of Classification Search
USPC ........ 382/100, 103, 106, 128–133, 153–156, 382/168, 173, 181, 199, 209, 224, 254, 382/275–276, 285–295, 298, 305, 312; 378/21, 28
See application file for complete search history.

(56) References Cited

U.S. PATENT DOCUMENTS

| | | | |
|---|---|---|---|
| 2013/0314440 A1 | 11/2013 | Simon et al. | |
| 2016/0321807 A1 | 11/2016 | Wiets et al. | |
| 2018/0303409 A1* | 10/2018 | Tsuji | G06T 7/62 |
| 2019/0125461 A1* | 5/2019 | Zheng | G06N 3/08 |
| 2019/0147295 A1* | 5/2019 | Rappaport | G06V 10/772 382/128 |
| 2021/0177522 A1* | 6/2021 | Boddington | A61B 34/30 |

OTHER PUBLICATIONS

Bandyopadhyay, O. et al. "Long-bone fracture detection in digital X-ray images based on digital-geometric techniques", Computer Methods and Programs in Biomedicine, Elsevier, Sep. 26, 2015, pp. 2-14, vol. 123, Amsterdam, NL, XP029333685.

Bandyopadhyay, O. et al. "Classification of long-bone fractures based on digital-geometric analysis of X-ray images", Pattern Recognition, Image Analysis, Allen Press, Dec. 6, 2016, pp. 742-757, vol. 26, No. 4, Lawrence KS, US, XP036112932.

Pries, A., et al. "Deep Morphing: Detecting bone structures in fluoroscopic x-ray images with prior knowledge", arxiv.org, Cornell University Library, Aug. 9, 2018, XP080896602.

Wang, L., et al. "Fast Automated Segmentation of Femoral Head in Fluoroscopic X-Ray Images", 8th IEEE International Symposium on Biomedical Imaging, 2011, pp. 984-988, From Nano to Macro, Chicago, IL, USA, 2011.

Cephas Paul Edward V et al: "A Robust Approach For Detection of the type of Fracture from X-Ray Images", ISSN International Journal of Advanced Research in Computer and Communication Engineering, Mar. 1, 2015 (Mar. 1, 2015), pp. 479-482, DOI: 10.17148/IJARCCE. 2015.43114; XP055768953.

* cited by examiner

BONE FRACTURE DETECTION AND CLASSIFICATION

CROSS-REFERENCE TO RELATED APPLICATIONS

This application is a continuation of U.S. patent application Ser. No. 17/309,395 filed on May 25, 2021, which is a U.S. National-Stage entry under 35 U.S.C. § 371 based on International Application No. PCT/EP2019/082222, filed Nov. 22, 2019, which was published under PCT Article 21(2) and which claims priority to Luxembourg Application No. 101008, filed Nov. 26, 2018, which are all hereby incorporated in their entirety by reference.

TECHNICAL FIELD

The invention relates to the field of computer assisted surgery. In particular, the invention relates to a device and a method for determining where and how a bone is fractured based on a 2D medical image. The method may be implemented as a computer program executable on a processing unit of the device.

BACKGROUND

The situation when treating a fractured femur (thigh bone) is taken as an example to illustrate the background of the invention. It will be apparent for a skilled person that similar situations can occur when treating other fractured bones.

Depending on where and how the shaft of a femur is fractured, it may be decided upon the way of treatment, e.g., repositioning of bone fragments and their fixation for healing. For example, an intramedullary nail may be inserted into the medullary canal of the bone to stabilize parts of the bone. Alternatively or additionally, one or more screws or other sub-implants may be utilized. In some cases, bone plates may be affixed to the surface of the fractured bone for fixation of fragments.

A classification of bone fractures has been established and information is available facilitating the decision how a specific fracture can be treated, once the fracture has been classified. However, a localization and classification of bone structures is not always straightforward.

In addition, other objects, desirable features and characteristics will become apparent from the subsequent summary and detailed description, and the appended claims, taken in conjunction with the accompanying drawings and this background.

SUMMARY

It would be beneficial for the surgeon to have assistance in detecting and classifying bone fractures on the basis of a medical image.

It may be seen as an object of the invention to provide a device and a method providing such an assistance. It may also be seen as an object of the invention to facilitate the assessment of a current anatomical situation.

This is achieved by the subject-matter of each of the independent claims. Further embodiments are described in the respective dependent claims.

The general concept of the invention can be described as following. First of all, an anatomical structure shown in a medical image is identified. Within the identified anatomical structure, fractures and bone segments are detected and localized. The detected fractures may be classified. Finally, a treatment may be proposed. Each of the aforementioned steps may be done manually with user input, automatically by an algorithm, or semi-automatically by an algorithm supported by a user input.

If the identification and localization of an anatomical structure shown in a medical image is supported by a user input, it may be sufficient if an algorithm suggests possible segments of, for example, bone contours. There exist algorithms that determine the location of specific bone features in medical images. These algorithms are often based on edge detection. An example is the localization of the femoral head as described in the paper: Michael Kohnen, Ola Friman, Horst K. Hahn: Fast automated segmentation of femoral heads in fluoroscopic medical images. In Proceedings of the 8th IEEE International Symposium on Biomedical Imaging, 2011: 984-988.

A more flexible approach is the localization and anatomical labeling of an entire bone. An example of such an approach is: Aaron Pries, Peter J. Schreier, Artur Lamm, Stefan Pede, Jürgen Schmidt: Deep morphing: Detecting bone structures in fluoroscopic images with prior knowledge, available online at https://arxiv.org/abs/1808.04441. This paper proposes an approach based on a deep neural network to detect bone structures in fluoroscopic images. The technique specifically addresses the challenges in the automatic processing of fluoroscopic X-rays, namely their low quality and the fact that typically only a small dataset is available for training the neural network. Since bone fracture classification is typically done based on diagnostic medical images, which have much higher quality than fluoroscopic X-rays, the deep-morphing technique works a fortiori on diagnostic medical images. The technique incorporates high-level information about the objects in the form of a statistical shape model. The technique consists of a two-stage approach (called deep morphing), where in the first stage a neural segmentation network detects the contour of the bone or other object, and then in the second stage a statistical shape model is fit to this contour using an Active Shape Model algorithm (but other algorithms can be used as well for the second stage). This combination allows the technique to classify points on the object contour. For instance, in the segmentation of a femur, the technique will be able to determine which points on the contour in the 2D X-ray projection image correspond to the lesser trochanter, and which points correspond to the femoral neck, etc. The paper demonstrates that deep morphing can successfully and accurately localize bones in medical images. Nevertheless, a bone contour suggested by a deep morphing algorithm may be validated and/or corrected by a user before proceeding.

Within the identified anatomical structure, fractures and bone segments are detected and localized. Typically, a fracture line appears in a diagnostic X-ray image as a dark line, i.e., a gap between fragments appears as a dark area. In the context of the disclosure it is to be understood that a fracture line may also be an edge of such a dark area, i.e., an edge at a gap between fragments. On the other hand, in the case of displaced bone fragments, the fragments may be pushed into each other or behind each other so that X-ray radiation passes through more bone tissue than usual, resulting in brighter lines and areas in the diagnostic X-ray image. In this case, a fracture line may be identified at the edge of a bright area.

The detection of fractures may thus proceed in a variety of ways. If the detection is done semi-automatically with support from a user, it may be sufficient to suggest potential fracture lines, among which the user selects the correct lines. Potential fracture lines may be identified by an algorithm based on edge detection, possibly supported by a priori information about the likely location and appearance of fractures. A starting point of a fracture line may also be identified by looking for gaps in a bone contour.

The detection of fractures may also proceed automatically by utilizing a deep neural net (DNN). Such a DNN may look for features, in particular lines, within the bone that are not typically present in a healthy bone. Another option would be to specifically train a DNN on fractures so that it may directly identify and localize specific fractures. The conceptual difference between these two potential approaches is that in the first case, the reference is that of healthy bones, whereas in the second case, the reference is that of fractured bones.

A device for assisting with bone fracture classification in accordance with an embodiment may generally comprise a processing unit adapted to receive image data of the medical image, to identify a bone structure in the medical image, and to localize, identify, and classify a fracture in the identified bone structure.

According to an embodiment, an outline or at least part of an outline of a bone or bone segment and possible fracture lines may be detected based on edge detection. It is to be understood that in the context of the invention, an outline (or contour or edge) of a bone is not just a clear and sharp line, but may be seen as a transition area with pixels being identified as part of a bone and pixels being identified as not part of a bone. In other words, the likelihood of a pixel being part of a bone may change in such an area from being likely part of a bone to being likely not part of the bone.

According to an embodiment, the device may have access to a 3D model of the patient's anatomy (acquired, e.g., through a prior 3D CT scan), or to a database containing a general 3D model of bones. In the latter case, the possible variations of anatomical structures may for instance be described by a statistical shape or appearance model. According to an embodiment, an outline of a bone or bone segment may then be detected by matching a virtual projection of the 3D model with the actual projection in the 2D medical image. This may also allow an identification of displaced bone fragments. During a surgery, it may be particularly useful to virtually reduce a fracture, e.g., in order to find a good entry point for opening a bone. Such an entry point may be based on an axis of a long bone, which could thus be virtually determined. Moreover, an identification of displaced bone fragments may also assist during an actual repositioning of bone fragments by providing a 3D reconstruction of the fragments (cf. patents U.S. Pat. Nos. 9,508,149 B2, 9,980,783 B2).

According to an embodiment, a deep neural net (DNN) may be implemented in the processing unit, wherein the neural net may be utilized for at least one out of the group consisting of bone structure identification, bone outline detection, fracture line determination, fracture line starting point detection, bone part displacement detection, and bone fracture classification.

According to an embodiment, the device may provide indications related to possible fracture lines. Furthermore, the device may classify a fracture based on identified fracture lines. For a complete picture, the device may provide information regarding secondary fractures that typically occur in connection with a classified fracture, even though such a secondary fracture may not be visible in the current medical image.

According to an embodiment, the device may further comprise an input device, wherein the processing unit may receive an input related to at least one out of the group consisting of bone structure identification, bone outline detection, fracture line determination, fracture line starting point detection, bone part displacement detection, and bone fracture classification.

Such input device may be for example a computer keyboard, a computer mouse, or a touch screen, to control a pointing device like a cursor on a monitor screen, which may also be included in the device.

Furthermore, the processing unit may be adapted to receive information from a data base which includes data of at least one out of the group consisting of a bone model, possible fracture lines and their likelihood, possible bone fragmentations and their likelihood, and a classification of bone fractures.

A combination of automatic processes for detection, identification, and/or classification as well as of manual inputs for detection, identification, and/or selection is also contemplated.

According to an embodiment, a priori information may be provided to the device. Such a priori information may include an indication of a likely fracture due to a specific accident of the patient. The a priori information may also provide an indication of where a fracture may be expected in a medical image, based, for instance, on a medical image of a fracture generated previously with a different imaging direction, or a 3D CT scan. Based on such 'a priori' information, the device may determine an expected location and path of a fracture line and may thus focus on a specific area in a medical image. This may be possible when utilizing the deep-morphing technology because it labels (i.e., assigns meaning to) points on a bone contour. Working with such 'a priori' information may allow a detection of fractures that might otherwise have been missed (e.g., because the fracture lines are not visible clearly enough).

Additionally, the processing unit may provide suggestions for an appropriate treatment to a user.

It is noted that the image data of the medical image may be received directly from an imaging device, for example a diagnostic X-ray device or a CT scan, or alternatively from a data base. Furthermore, the image data may be generated artificially, i.e. may represent a simulated medical image. The image may represent an anatomical structure of interest, in particular, a bone.

Any bone, for example, a bone of a hand or foot, in particular a long bone of the lower extremities, like the femur and the tibia, and of the upper extremities, like the humerus, may be subject to an embodiment of the method.

A neural net used in accordance with an embodiment may be trained based on a multiplicity of data that is comparable to the data on which it will be applied. In case of an assessment of bone structures in images, the neural net should be trained on the basis of a multiplicity of medical images of bones of interest. It will be understood that the neural net may also be trained on the basis of simulated medical images. Simulated medical X-ray images may, for example, be generated from 3D CT data, as described in the appendix of the paper: Aaron Pries, Peter J. Schreier, Artur Lamm, Stefan Pede, Jürgen Schmidt: Deep morphing: Detecting bone structures in fluoroscopic X-ray images with prior knowledge, available online at https://arxiv.org/abs/1808.04441.

According to an embodiment, more than one neural network may be used, wherein each of the neural nets may specifically be trained for a sub-step necessary to achieve a desired solution. For example, a first neural net may be trained to evaluate medical image data so as to localize an anatomical structure like a bone, whereas a second neural net may be trained to detect a fracture line. The processing unit may then simply provide a corresponding information to a user of the device. It is also possible to combine neural networks with other algorithms, including but not limited to Active Shape Models. It is noted that a neural net may also learn to determine a fracture line without the need to first identify features in an image or classify anatomical structures.

It is noted that the processing unit may be realized by only one processor performing all the steps of the process, or by a group or plurality of processors, for example a central processor for controlling (i) a first sub-processor on which a first neural net is implemented assessing the image data including an identification of anatomical structures like a bone surface, (ii) a second sub-processor on which a second neural net is implemented specialized for determining a fracture line, and (iii) a further processor for controlling a monitor for visualizing results. The central processor may also control an X-ray imaging device. As a skilled person may appreciate, the processing unit may be located at or nearby the location of an imaging device used for fracture detection, but may also be located at a remote location, even in a cloud (accessible over the internet).

According to an embodiment, the device may further comprise storage means providing a database for storing, for example, medical images. It will be understood, that such storage means may also be provided in a network to which the system may be connected, and that data related to the neural net may be received over that network.

Furthermore, the device may comprise an imaging unit for generating at least one 2D medical image, wherein the imaging unit may be capable of generating images from different directions.

According to a further embodiment, a computer software or computer program product is provided including sets of instructions, which when executed on an appropriate device, causes the device to perform aspects as described above.

A computer program may preferably be loaded into the random access memory of a data processor. The data processor or processing unit may thus be equipped to carry out at least a part of the described method. Further, the invention relates to a computer-readable medium such as a CD-ROM on which the computer program may be stored. However, the computer program may also be presented over a network like the World Wide Web and can be downloaded into the random access memory of the data processor from such a network. Additionally or alternatively, the computer program or parts thereof may be carried out by cloud computing.

Aspects of embodiments may be summarized as follows.

It is a major aim of the disclosed embodiments to assist in detection and/or classification of bone fractures and displacements based on a 2D medical image.

An outline of a bone may be automatically detected.

A semi-automatic detection of bone contours and fracture lines is also contemplated, wherein a device may propose possible contours and fracture lines and a user may select at least one.

A computer algorithm may use edge detection to find features of an anatomical structure in a projection image.

Alternatively or additionally, a deep neural net may be used, wherein the neural net may be trained on detection of specific features, i.e. looking for those features (and evaluating their relative position to each other).

A deep neural net may act as a semantic edge detector and/or may predict parameters of geometric shapes.

A deep neural net may automatically or semi-automatically detect bone contours and fracture lines.

A deep neural net may be trained on images, either on actual or on simulated or on a combination thereof, to detect features.

Alternatively or additionally, an active shape or appearance model/point distribution model approach or variant thereof may be applied to detect or classify features in a projection image.

The device may match a bone model to a detected outline of a bone or bone fragment.

Based on detected and/or selected fracture lines and based on a data base of fracture classifications, appropriate classifications may be proposed in order of their likelihood.

Additionally, a non-invasive reference body may be used to match an orientation.

If available, a pre-operative CT image may be used to support fracture line detection and an automatic segmentation of bone fragments.

The device may also show possible treatment options ranked by outcome/complexity/costs, possibly taking into account patient data like age and constitution.

It has to be noted that embodiments are described with reference to different subject-matters. In particular, some embodiments are described with reference to method-type claims (computer program) whereas other embodiments are described with reference to apparatus-type claims (device). However, a person skilled in the art will gather from the above and the following description that, unless otherwise specified, any combination of features belonging to one type of subject-matter as well as any combination between features relating to different subject-matters is considered to be disclosed with this application.

The aspects defined above and further aspects, features and advantages of the present invention can also be derived from the examples of the embodiments to be described hereinafter and are explained with reference to examples of embodiments also shown in the figures, but to which the invention is not limited.

BRIEF DESCRIPTION OF THE DRAWINGS

The present invention will hereinafter be described in conjunction with the following drawing figures, wherein like numerals denote like elements, and.

Figure 1:
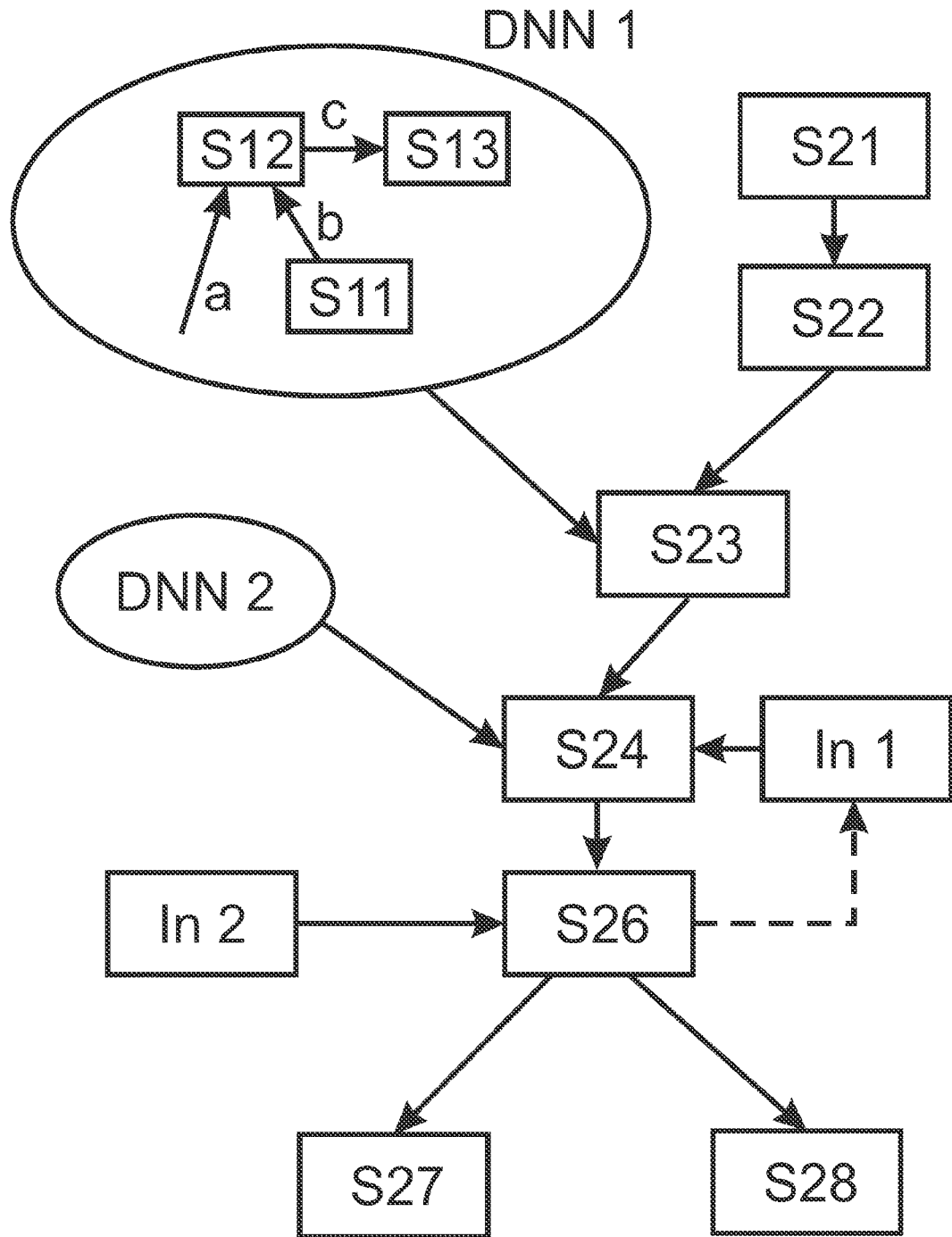
FIG. 1 shows a flow chart of procedural steps in accordance with an embodiment.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF THE EMBODIMENTS

The following detailed description is merely exemplary in nature and is not intended to limit the invention or the application and uses of the invention. Furthermore, there is no intention to be bound by any theory presented in the preceding background of the invention or the following detailed description.

The flow-chart in FIG. 1 illustrates the principle of the steps performed in accordance with an embodiment of the disclosed invention. It will be understood that the steps described are major steps, wherein these major steps might be differentiated or divided into several sub-steps. Furthermore, there might be also sub-steps between these major steps.

As a first aspect, "training" of a so-called "deep neural net" (DNN) is described with reference to steps S11, S12 and S13 in FIG. 1.

When training a DNN, for example, to be able to identify an anatomical structure like a bone in a medical image, an image with known ground truth is provided to the DNN. Indicated with the arrow 'a' in FIG. 1 is the possibility to provide a real image (generated by imaging a patient). The step S11 may be seen as a step of generating a simulated medical image. A simulated image may thus be provided at arrow 'b' to the DNN (alternatively or additionally to a provision of a real image along arrow 'a'), which assesses the image in step S12. For example, the algorithm may assign to each pixel of the image a likelihood that a pixel is part of an anatomical feature or aspect. In step S13, the DNN (here DNN 1) may be able to provide information on whether a plurality of pixels constitute an anatomic structure. Based on processing a multiplicity of images and comparing the results with the known ground truth, the parameters of the DNN are adjusted, and the DNN "learns" to identify for example a femur so as to be able to do so even if an actual image shows a femur in a way that differs from all images used in the training phase. As already described above, the DNN may include aspects of active shape models, point distribution models, or the like.

Figure 3:
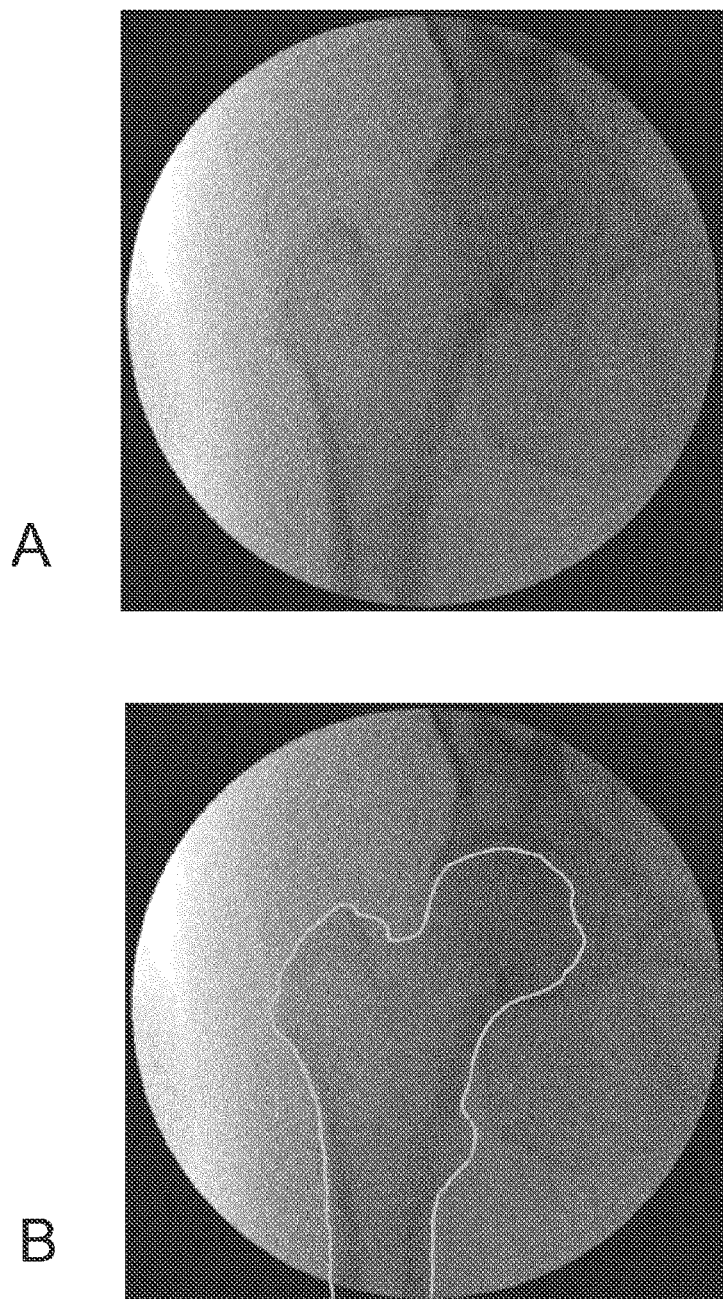
FIG. 3 shows an example of medical images suitable for training a neural net to recognize an aspect of a bone.

As an example, FIG. 3 (panel A) shows an X-ray visualization of a hip joint with a part of hip bone and a proximal part of a thigh bone (a femur). When training a DNN to localize the contour of a femur, the ground truth (shown in panel B) is provided to the DNN along with the medical image. By using many such images in its training, a DNN is then able to generalize its localization ability to previously unseen images.

In step S21 in FIG. 1, a first medical image may be generated by an X-ray imaging device. The first medical image is then received in step S22 by a processing unit.

As used herein, the term "receiving an image" basically refers to the fact that at least one image is necessary to perform the subsequent steps. That is, the term "receiving an image" may encompass both receiving of an image directly when generated by an imaging device and loading of an image from a data base into a processing unit. It is just required that a received image is suitable for identifying an aspect or feature of a bone. A person skilled in the art will consequently understand that the image processing as described herein may be performed independently from an imaging device.

In step S23, the received image is processed utilizing DNN 1, wherein at least one anatomical feature is identified and a location thereof is determined. This may be done as described above.

In step S24, the identified bone is further processed so as to determine at least one fracture line. In the embodiment illustrated in FIG. 1, step S24 is performed utilizing a second deep neural net DNN 2 for determination of the fracture lines. The second deep neural net DNN 2 may be trained on the basis of images like those of FIGS. 4 to 6 with labelled ground truth.

Figure 4:
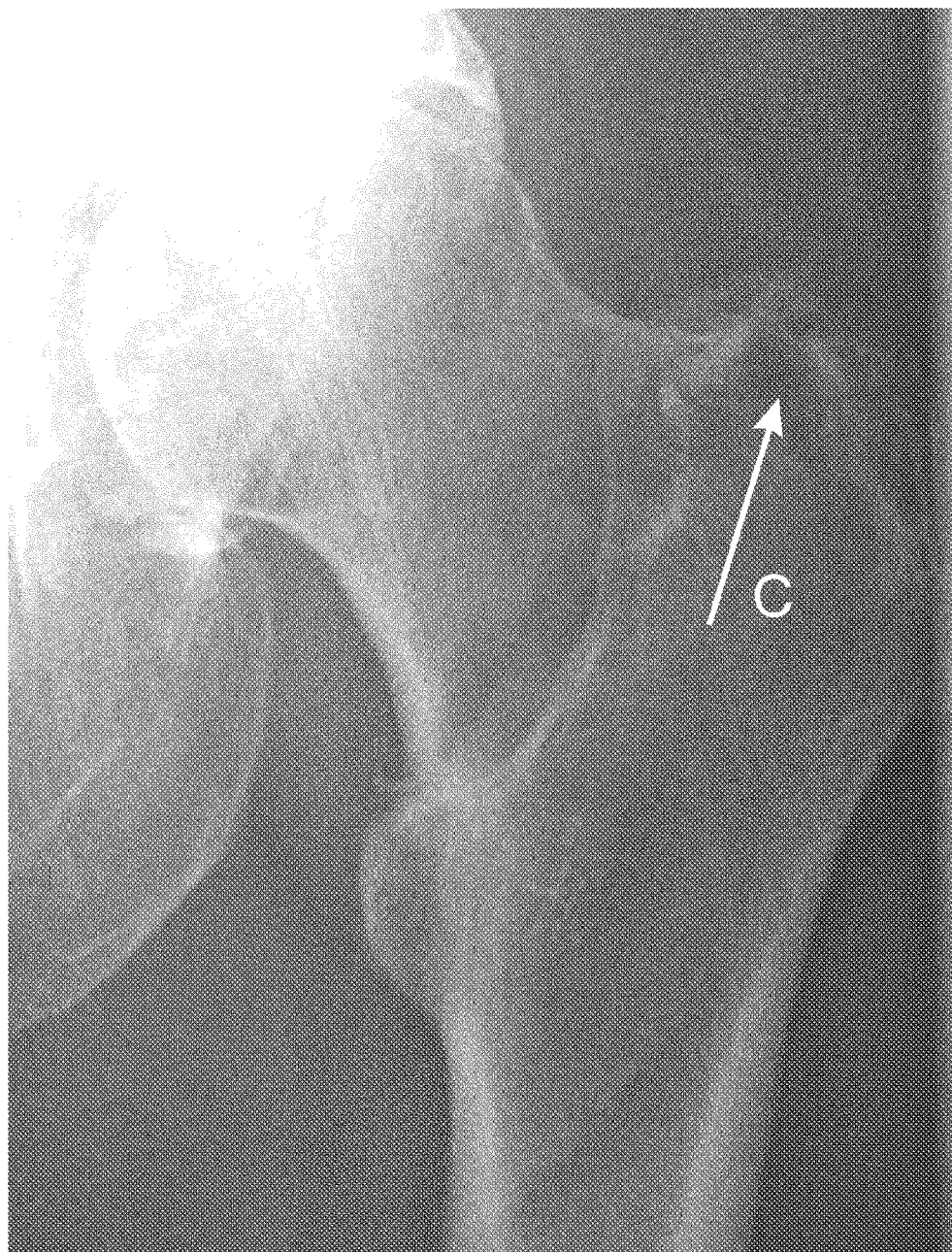
FIGS. 4 to 6 show examples of medical images including bone fractures.
Figure 5:
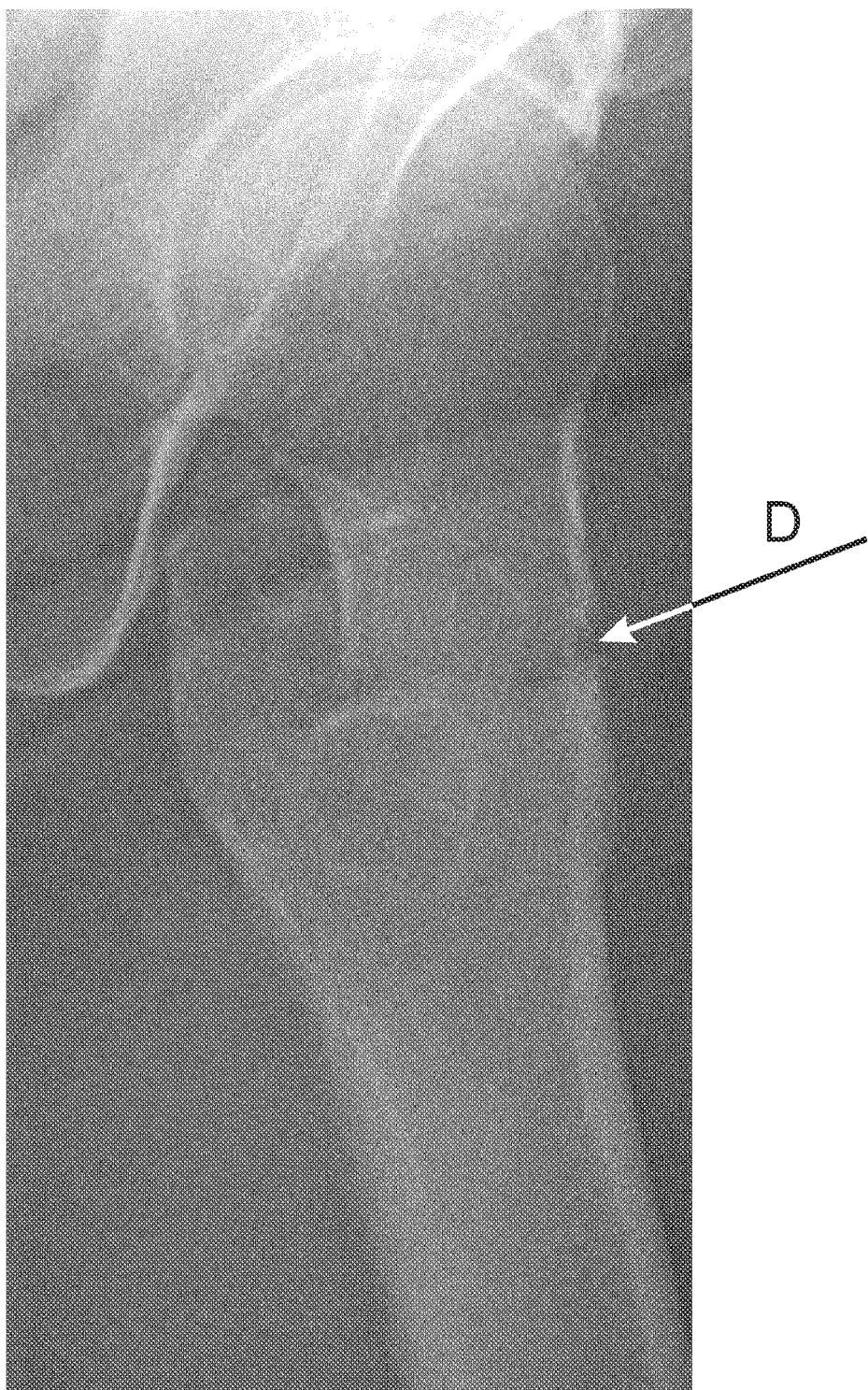

FIG. 4 shows an X-ray image of a hip joint, generated more or less with an anterior to posterior view (AP). Indicated by arrow C is a fracture, which is recognizable as a darker area. FIG. 5 shows the same fracture from a different viewing angle (medial-lateral, ML). In this figure, the fracture is more easily recognizable as the dark area (indicated by arrow D), which extends from the outline of the bone inward. Because deep morphing classifies points on the object contour, it may be possible to first identify the fracture in FIG. 5, and then search for a fracture at the corresponding part of the bone in FIG. 4. This allows identifying a difficult-to-see fracture in FIG. 4 by using 'a priori' information gathered by processing another image.

Figure 6:
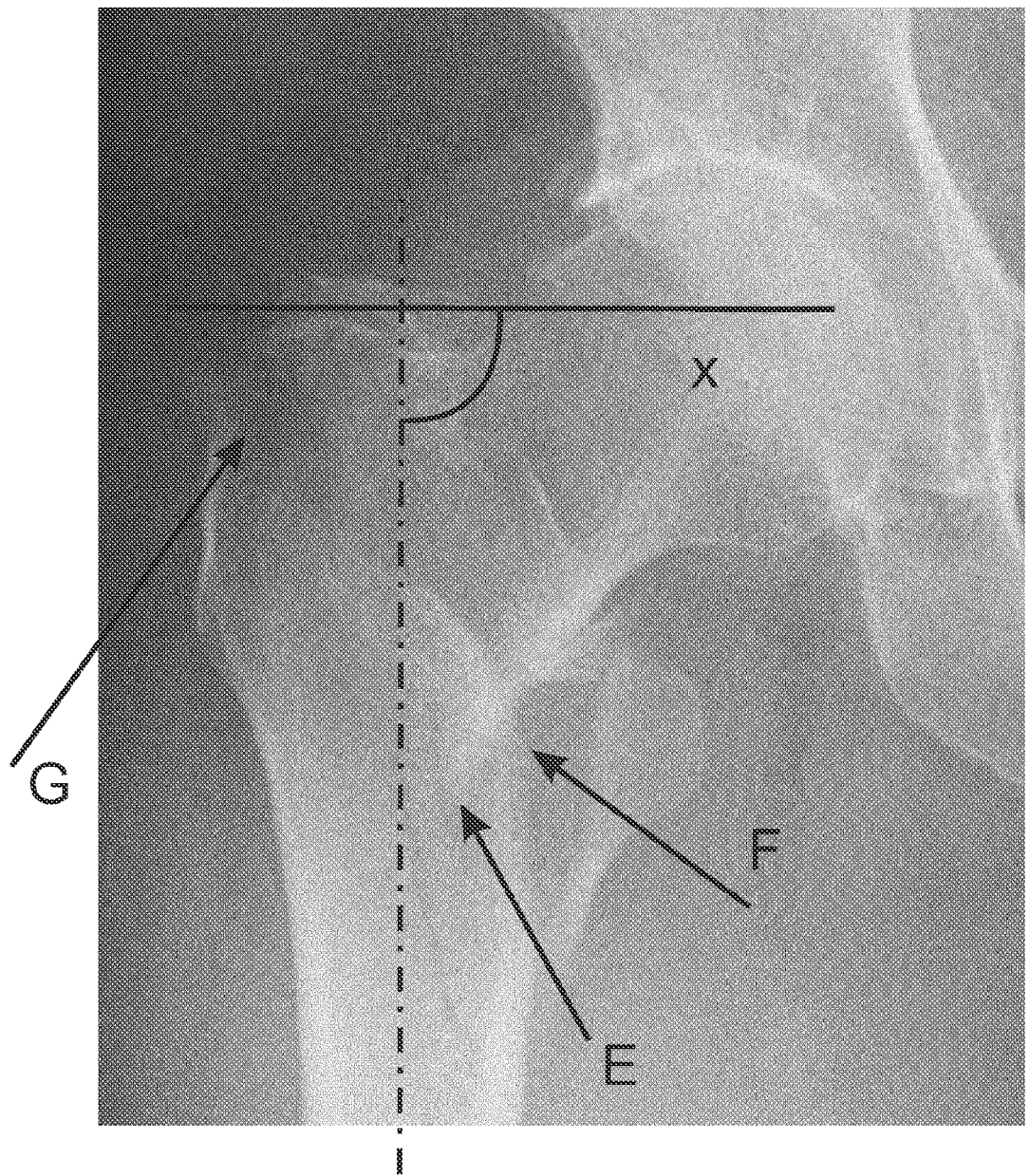

FIG. 6 is a diagnostic X-ray image of a fracture where the proximal end of the femur is pushed into the shaft in axial direction and tilted in medial direction, i.e. towards the hip. The tilting may be recognized by the fact that the tip of the greater trochanter is now above the center x of the femur head when measured from a line perpendicular to the longitudinal axis of the femur shaft. Furthermore, a gap opens at arrow G in FIG. 6, visible as darker area, which is also an indication of the tilting. The compressed state of the bone can be recognized by the brighter area above arrow E. In a healthy bone, this brighter area would be positioned above arrow F, which is now darker than normal.

The results of the fracture detection in step S24 may be improved upon by information provided to the device as input In 1. In an exemplary scenario, it may be known how the accident of the patient took place, for example a sideward fall onto the hip joint. Based on that information, the device may determine fractures that may likely be expected in such a scenario, before assessing the medical image. Accordingly, the information may be denoted as a priori information. Thus, the device may focus on specific areas of the imaged bone when assessing the medical image in step S24.

Lines and areas as detected in step S24 may be identified or at least suggested as fractures in step S26. Assuming that the device shows only one line or area as result on a display device like a monitor, a user may check the result and may confirm or correct it via input In 2. In a case in which the device detects more than one line or area as potential fractures and shows these as result of step S24 on a monitor, a user may provide a selection by way of an input In 2. Finally, the device may show identified fractures as result of step S26.

Another scenario for the input In 1 can be explained with reference to FIGS. 4 and 5. These figures show the same fracture albeit from different viewing directions. When starting for example with the medical image of FIG. 5, the device may have identified the fracture indicated by arrow D in step S26. The information that the fracture is basicervical may then be provided (along the dashed arrow in FIG. 1) as input In 1 to the device when assessing the next image, for example the image of FIG. 4. Taking the input into account, the DNN 2 is more likely to detect the fracture as indicated by arrow C in FIG. 4. A skilled person will appreciate that a second medical image may improve the recognition of a fracture, as for example illustrated by the above scenario.

An algorithm trained on the basis of a multiplicity of images showing bones with the same type of fracture, may be able to determine a fracture with high accuracy.

The determined bone fracture may be classified in step S27. The device may have access to information of fracture classification as typically used in a clinical environment. In such a classification, typical fractures are sorted by bone, by fracture location, by length of fracture line, by extension direction of the fracture, by number of fractures, and so on. By comparing the determined or identified fracture with the fractures in the classification, the device may provide a classification of the determined fracture.

Additionally or alternatively, the device may provide suggestions for treatment in step S28. For example, the device may suggest a specific implant for fracture fixation. Otherwise, the device may also request further imaging and/or further measurement of the bone with the fracture.

It will be understood that the flow chart is only one embodiment, and that for example steps S21, S27 and S28 as well as In 1 and In 2 may not be executed so as to achieve a result as intended in accordance with the invention. As already mentioned, the aspects achieved by the deep neural nets DNN 1 and DNN 2 may also be achieved by only one DNN or by more than the mentioned two.

Figure 2:
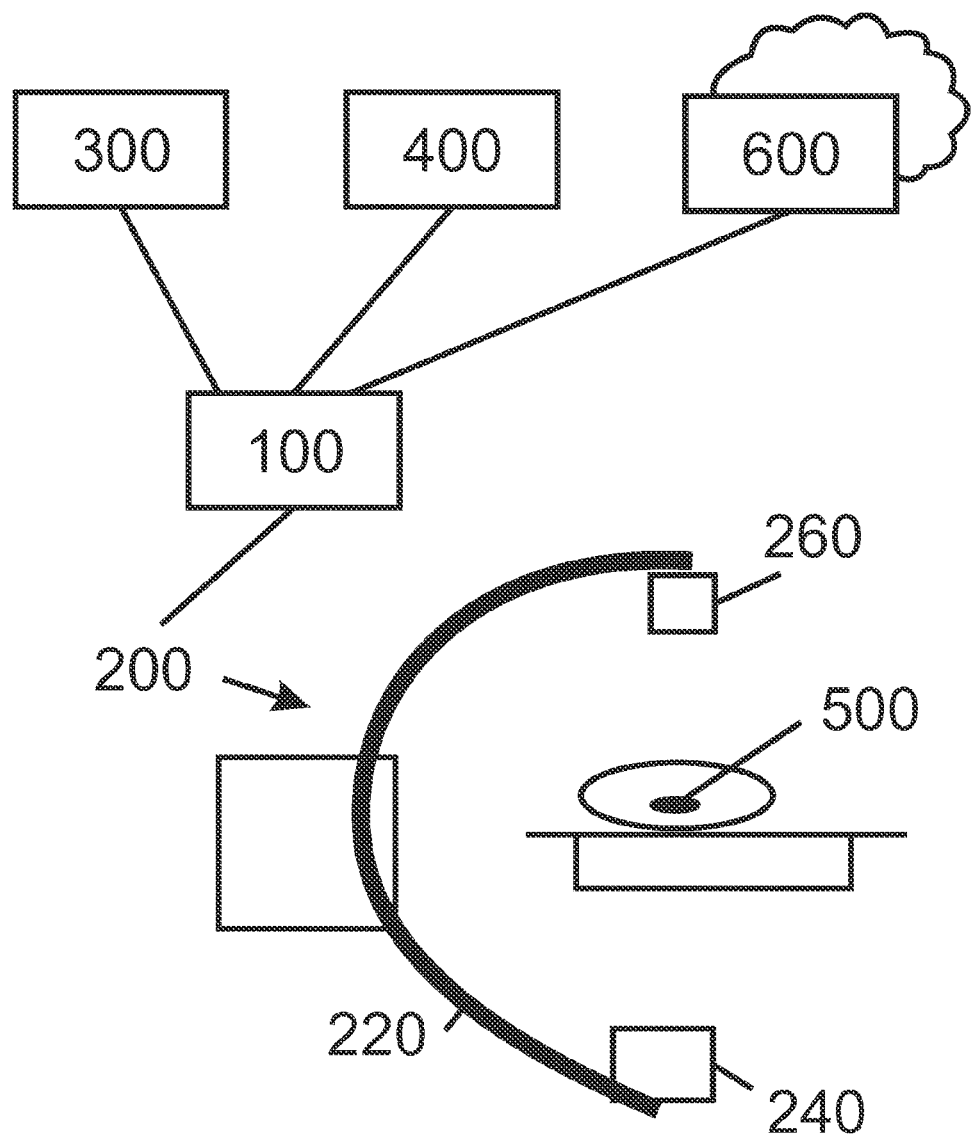
FIG. 2 shows aspects of a device in accordance with an embodiment.

FIG. 2 shows an exemplary embodiment of a device. Substantially a processing unit 100 is part of the device, necessary for performing the above described process. The device may further comprise an input device 300, for example a computer mouse, a trackball, a keyboard, a touchpad or the like, a monitor 400, which may also be a touch screen, and a data base 600, which may also be a remote data base like an internet cloud.

An exemplary imaging device 200 includes an X-ray source 240 and an X-ray detector 260, wherein these two devices may be mounted on a C-arm 220. It will be understood that the device may also comprise a non-invasive imaging modality like a computer tomography device, a magnetic resonance device, or an ultrasound device as imaging device instead of or additional to the shown C-arm based X-ray device.

Finally, a region of interest 500 is shown. Within said region, for example a bone of a patient may be located which is to be treated.

While embodiments have been illustrated and described in detail in the drawings and afore-going description, such illustrations and descriptions are to be considered illustrative or exemplary and not restrictive, and the invention is not limited to the disclosed embodiments.

Other variations to the disclosed embodiments can be understood and effected by those skilled in the art in practising the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims.

The mere fact that certain measures are recited in mutually different dependent claims does not indicate that a combination of these measures can not be used to advantage. The computer program may be stored/distributed on a suitable medium such as an optical storage medium or a solid-state medium supplied together with or as a part of another hardware, but may also be distributed in other forms, such as via the Internet or other wired or wireless telecommunication systems. Any reference signs in the claims should not be construed as limiting the scope.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A device for assisting with bone fracture detection, the device comprising
a processing unit configured to:
receive image data of a medical image from a device selected from the group consisting of a C-arm based X-ray device, a diagnostic X-ray device, a computer tomography device, a magnetic resonance device, an ultrasound device, a data detection device or an image storage device;
identify a bone structure in the medical image;
determine a fracture line in the identified bone structure; and
detect a bone feature selected from the group consisting of at least a portion of an outline of the identified bone structure, a point of the fracture line on an outline of the identified bone structure, a relative displacement of bone parts of the identified bone structure, or a combination thereof, wherein the bone feature is detected based on edge detection; and;
implement a neural net to generate a corresponding output selected from a group consisting of bone structure identification, fracture line determination, bone outline detection, fracture line point detection, bone part displacement detection, bone fracture classification, or a combination thereof.

2. The device of claim 1, wherein the processing unit is further configured to classify the bone fracture and to generate a corresponding output.

3. The device of claim 1, wherein the neural net implemented in the processing unit comprises a deep neural net (DNN).

4. The device of claim 1, wherein the processing unit is further configured to receive information from a data base that is selected from a group consisting of a bone model, a bone fracture data set including a plurality of bone fracture lines and a likelihood thereof, a bone fragmentation data set include a plurality of bone fragmentations and a likelihood thereof, a classification data set including a plurality of bone fracture classifications, or a combination thereof.

5. The device of claim 1, further comprising a memory unit storing a set of instructions, wherein the memory unit is operably connected with the processing unit to execute the set of instructions for assisting with bone fracture detection.

6. A method of assisting with bone fracture detection, the method comprising the steps of
receiving image data of a medical image from a device selected from the group consisting of a C-arm based X-ray device, a diagnostic X-ray device, a computer tomography device, a magnetic resonance device, an ultrasound device, a data detection device or an image storage device;
identifying a bone structure in the medical image;
determining a fracture line at the identified bone structure;
detecting a bone feature selected from the group consisting of at least a portion of an outline of the identified bone structure, a point of the fracture line on an outline of the identified bone structure, a relative displacement of bone parts of the identified bone structure, or a combination thereof, wherein the bone feature is detected based on edge detection; and implementing a neural net in a processing unit to generate a corresponding output selected from a group consisting of bone structure identification, fracture line determination, bone outline detection, fracture line point detection, bone part displacement detection, bone fracture classification, or a combination thereof.

7. The method of claim 6, further comprising classifying the bone fracture and generating a corresponding output.

8. The method of claim 6, wherein the neural net implemented in the processing unit further comprises a deep neural net (DNN).

9. The method of claim 6, further comprising receiving information from a data base that is selected from a group consisting of a bone model, a bone fracture data set including a plurality of bone fracture lines and a likelihood thereof, a bone fragmentation data set including a plurality of bone fragmentations and a likelihood thereof, a classification data set including a plurality of bone fracture classifications, or a combination thereof.

10. A non-transitory, computer-readable memory storing a set of instruction that, when executed on a processing unit, performs a method of assisting with bone fracture detection comprising:

receiving image data of a medical image from a device selected from the group consisting of a C-arm based X-ray device, a diagnostic X-ray device, a computer tomography device, a magnetic resonance device, an ultrasound device, a data detection device or an image storage device;

identifying a bone structure in the medical image;

determining a fracture line at the identified bone structure; and detecting a bone feature selected from the group consisting of at least a portion of an outline of the identified bone structure, a point of the fracture line on an outline of the identified bone structure, a relative displacement of bone parts of the identified bone structure, or a combination thereof, wherein the bone feature is detected based on edge detection; and implementing a neural net in a processing unit to generate a corresponding output selected from a group consisting of bone structure identification, fracture line determination, bone outline detection, fracture line point detection, bone part displacement detection, bone fracture classification, or a combination thereof.

11. The non-transitory, computer-readable memory of claim 10 wherein the set of instruction that, when executed on a processing unit, performs a method further comprising classifying the bone fracture and generating a corresponding output.

12. The non-transitory, computer-readable memory of claim 10 wherein the set of instruction that, when executed on a processing unit, performs a method further comprising receiving information from a data base that is selected from a group consisting of a bone model, a bone fracture data set including a plurality of bone fracture lines and a likelihood thereof, a bone fragmentation data set including a plurality of bone fragmentations and a likelihood thereof, a classification data set including a plurality of bone fracture classifications, or a combination thereof.

13. The non-transitory, computer-readable memory of claim 10 wherein the neural net implemented in the processing unit further comprises a deep neural net (DNN).

\* \* \* \* \*